United States Patent [19]
Thiessen

[11] Patent Number: 5,848,871
[45] Date of Patent: *Dec. 15, 1998

[54] METERING TROUGH HOPPER HAVING FLEXIBLE BLADED AUGER

[76] Inventor: Terry Thiessen, Box 2351, Strathmore, Alberta, Canada, T1P 1K3

[*] Notice: This patent issued on a continued prosecution application filed under 37 CFR 1.53(d), and is subject to the twenty year patent term provisions of 35 U.S.C. 154(a)(2).

[21] Appl. No.: 602,118
[22] Filed: Feb. 15, 1996
[51] Int. Cl.⁶ .................................................. B65G 19/04
[52] U.S. Cl. ........................................... 414/607; 414/725
[58] Field of Search ...................................... 414/306, 310, 414/326, 607, 725, 526; 198/550.1, 659, 677

[56] References Cited

U.S. PATENT DOCUMENTS

| | | | |
|---|---|---|---|
| 2,829,896 | 4/1958 | Swenson | 414/607 X |
| 3,722,666 | 3/1973 | Ulm et al. | 198/659 |
| 4,055,255 | 10/1977 | Vasquez | 414/725 X |
| 4,144,981 | 3/1979 | Borgen | 414/607 |
| 4,266,902 | 5/1981 | Forsberg | 414/326 X |
| 4,755,099 | 7/1988 | Belveal | 414/607 |
| 4,798,510 | 1/1989 | Lazenby | 414/607 |
| 4,819,578 | 4/1989 | Koiso et al. | 198/659 X |
| 4,864,748 | 9/1989 | Boyer | 414/526 X |
| 5,182,057 | 1/1993 | Johnson | 414/725 X |
| 5,337,658 | 8/1994 | Bruke | 198/659 X |
| 5,433,577 | 7/1995 | Roycraft | 198/677 X |
| 5,439,147 | 8/1995 | Bitschnau | 414/326 X |
| 5,592,760 | 1/1997 | Kohout | 414/526 X |
| 5,687,832 | 11/1997 | Thiessen | 198/677 X |

FOREIGN PATENT DOCUMENTS 1596655  11/1991  U.S.S.R. ................. 414/607

Primary Examiner—James W. Keenan
Attorney, Agent, or Firm—G. F. Gallinger

[57] ABSTRACT

A hopper for moving and accurately placing granular materials and granular slurries. The hopper comprises: an elongate feed trough having two opposite end portions and an open top side portion so that the trough may be filled along the open top side portion; an elongate auger having flexible blades, to facilitate non-jamming operation, positioned in and extending along a bottom portion of the trough, said auger having a drive and a floating discharge end portion; a drive positioned adjacent to one end portion of the trough and releasably connected the drive end portion of the auger; a discharge sleeve positioned in the other end portion of the trough encircling the other floating discharge end portion of the auger. The trough may be lifted from a long side portion thereof with the loader so that the center of gravity of the trough is closely adjacent to the loader, enabling a small loader to lift an adequately large payload, and enabling an operator thereof to view, meter, and accurately position the discharge end of the auger. In the preferred embodiment the auger is driven by a hydraulic pump. The trough hopper has dramatically reduced labor required to transport and pour mixed cement or other materials in tight and elevated places.

11 Claims, 4 Drawing Sheets

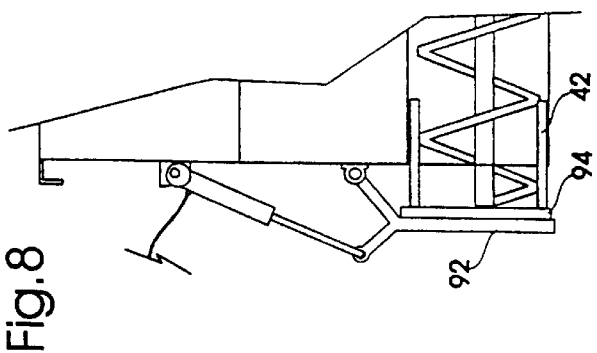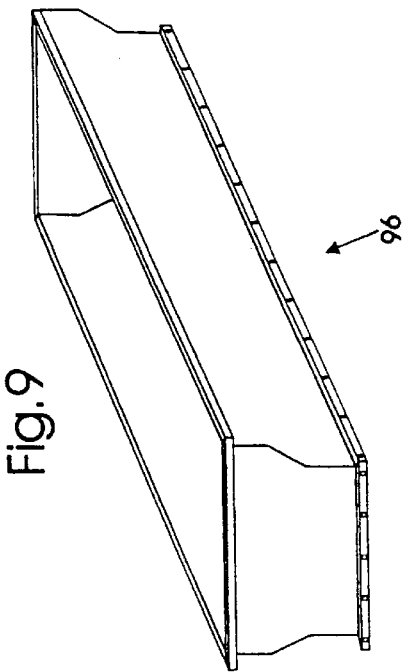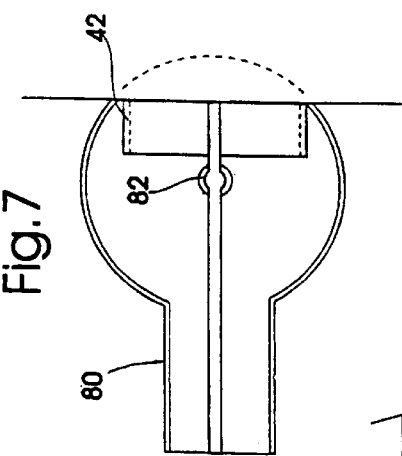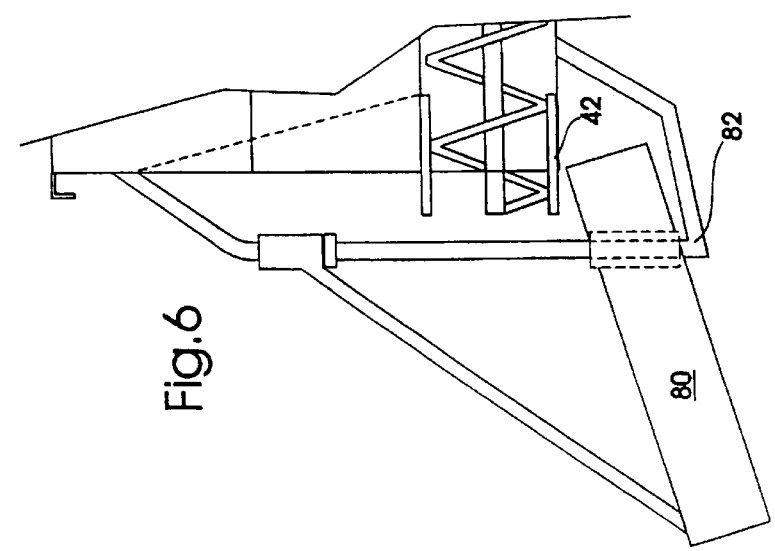

METERING TROUGH HOPPER HAVING FLEXIBLE BLADED AUGER

CONCURRENTLY FILED APPLICATION

Terry Thiessen has concurrently filed this application with an application, Ser. No. 08/602,117, now U.S. Pat. No. 5,687,832, for a Flexible Bladed Auger. The Metering Trough Hopper Having A Flexible Bladed Auger operates best in conjunction with such a Flexible Bladed Auger. All information disclosed in the concurrently filed application is incorporated herein by reference.

FIELD OF THE INVENTION

This invention relates to hoppers used to move granular materials and slurries thereof, and more particularly to such buckets and hoppers which have a means for lifting and a mechanism to regulate discharge.

BACKGROUND OF THE INVENTION

The traditional method of transporting mixed cement is in a wheel barrow. The problem with this approach is that it is heavy and time consuming work. Additionally, there are many applications in which there are other drawbacks. Frequently the mixed cement must be poured into an elevated form. When the form is higher than the wheel barrow then the mixed cement must be lifted shovel by shovel. Another problem arises when pouring the mixed cement into a small form such as a curb. Then, not only is it time consuming, but it is nearly impossible to pour the mixed cement from the wheel barrow without spilling it.

On larger projects contractors typically utilize a crane and a bucket for transporting mixed concrete to any location in which mixed cement must be poured. However the problem with this approach is that even where a small crane is on site, the hourly cost of using it is excessive. Additionally many locations including inside buildings, inside pads and piers, as well as concrete walls in restricted areas, curbs in tight areas, curbs on new paved parking lots, and other smaller jobs, render a crane impractical.

OBJECTS AND STATEMENT OF THE INVENTION

It is an object of this invention to provide a labor saving alternative to transporting and pouring mixed cement with a wheel barrow. It is an object of this invention to provide a mixed cement hopper which has a regulated discharge for accurate placement of mixed cement within walls and columns. It is yet a further object of this invention to provide a means of lifting mixed cement to heights inaccessible to a wheel barrow, even as high as a second story. It is yet a further object of this invention to economically transport mixed cement into tight locations out or inside buildings. It is yet an additional object of this invention to provide a discharge hopper which is able to provide a metered discharge of mortar for a brick layer, asphalt for filling a pot hole, or mixed cement for a core fill. The metered discharge may be of any viscous mix, or even a granulated material such as sand which sometimes must be bagged. It is a final object of this invention to provide a regulated discharge hopper for any type of loader. (In this application a loader is defined as any front end loading equipment including a forklift, a skid steer or Bobcat™ loader, or any type of crane including such cranes having a telescoping boom which could be adapted with an attachment to carry a hopper, as well as any rear end loaders such as a backhoe, which similarly could be adapted to carry the hopper with a quick attachment.) It is advantageous for a contractor to adapt an existing loader having a broad range of utility to a particular application as compared to committing substantial capital to a dedicated piece of equipment.

One aspect of this invention provides for a hopper for use with a loader comprising: an elongate feed trough having two opposite end portions and an open top side portion so that the trough may be filled along the open top side portion; an elongate auger having flexible blades, to facilitate non-jamming operation, positioned in and extending along a bottom portion of the trough, said auger having a drive and a floating discharge end portion; drive means positioned adjacent to one end portion of the trough and releasably connected to the drive end portion of the auger; a discharge sleeve positioned in the other end portion of the trough encircling the other floating discharge end portion of the auger; means to lift the trough from a long side portion thereof with the loader so that the center of gravity of the trough is closely adjacent to the loader, enabling a small loader to lift an adequately large payload, and enabling an operator thereof to view, meter, and accurately position the discharge end of the auger.

A preferred aspect of this invention provides for a hopper as above wherein the drive for the auger is hydraulic and adapted to be removably connected to an hydraulic pump on the loader.

Various other objects, advantages and features of this invention will become apparent to those skilled in the art from the following description in conjunction with the accompanying drawings.

FIGURES OF THE INVENTION

FIG. 6 is a partial side view of the discharge end of the trough hopper shown in FIG. 1 having a rotatable discharge chute mounted thereon.

FIG. 7 is a partial top view of the rotatable discharge chute shown in FIG. 6.

FIG. 8 is a partial side view of the discharge end of the trough hopper shown in FIG. 1 having an hydraulically controlled discharge cover mounted on the discharge sleeve.

FIG. 9 is a perspective view of a hopper extension which may be bolted onto the top side portion of the trough hopper shown in FIG. 1.

Figure 1:
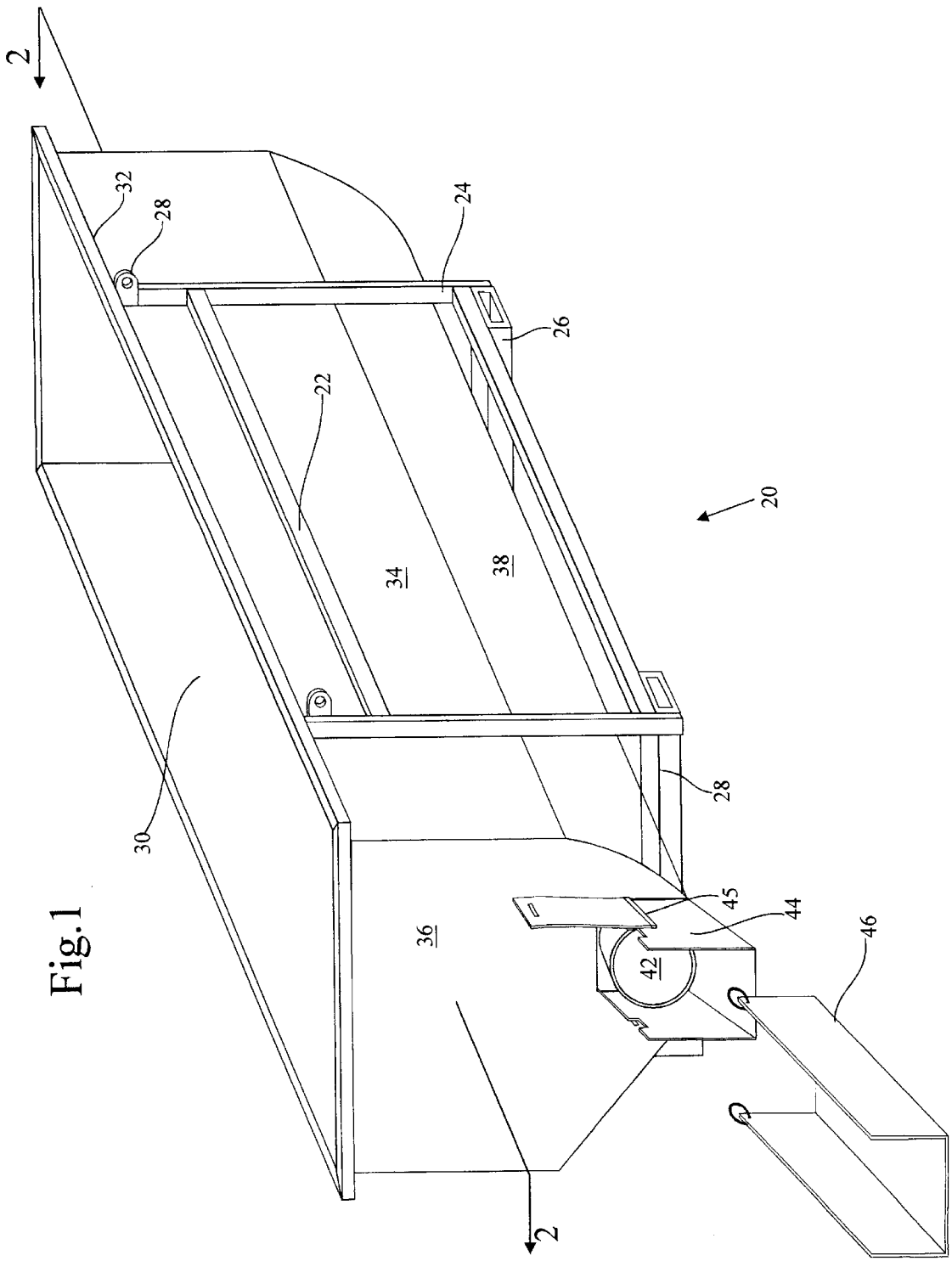
FIG. 1 is a perspective view of a Metering Trough Hopper Having A Flexible Bladed Auger viewed from its discharge end.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Turning now to the drawings and more particularly to FIG. 1 we have a perspective view of a Metering Trough Hopper Having A Flexible Bladed Auger 20 adapted for use with a fork lift (not shown). The preferred embodiment of the trough hopper 20 comprises a rectangular frame 22 elevated on four legs 24. These legs 24 may be fitted with caster wheels (not shown). Opposite end portions of the bottom side portion of the rectangular frame 22 have fork channels 26. The fork channels 26 in addition to carrying the hopper also serve as slide means under the hopper 20. If the hopper 20 is carried by a loader (not shown) other than a forklift (not shown) the hopper 20 is similarly lifted by attaching to the frame 22. The hopper 20 is adapted to be lifted from either side so that the discharge may be turned to a selected side of a forklift (not shown). The hopper 20 is additionally provided with lifting hasps 28 affixed to the top outside portion of the frame 22.

The hopper housing comprises an elongate feed trough 30 having two opposite end portions and an open top side portion so that the trough 30 may be filled along the open top side portion. Most preferably the top side portion is rectangular and has a top rail 32 therearound, vertical sidewalls 34, and endwalls 36. The trough 30 has a rounded bottom sidewall 38 which has a lower portion which fits closely around a flexible bladed auger 40 (shown only in FIG. 2) which it houses. A sleeve 42 projects horizontally out of the discharge end of the hopper 20. The discharge sleeve 42 encircles and positions the discharge end of the auger 40. A chute support 44, having a flexible flap cover 45, slopes outwardly away from and downwardly around the discharge sleeve 42. The chute support 44 is adapted to carry a removable chute 46.

Figure 2:
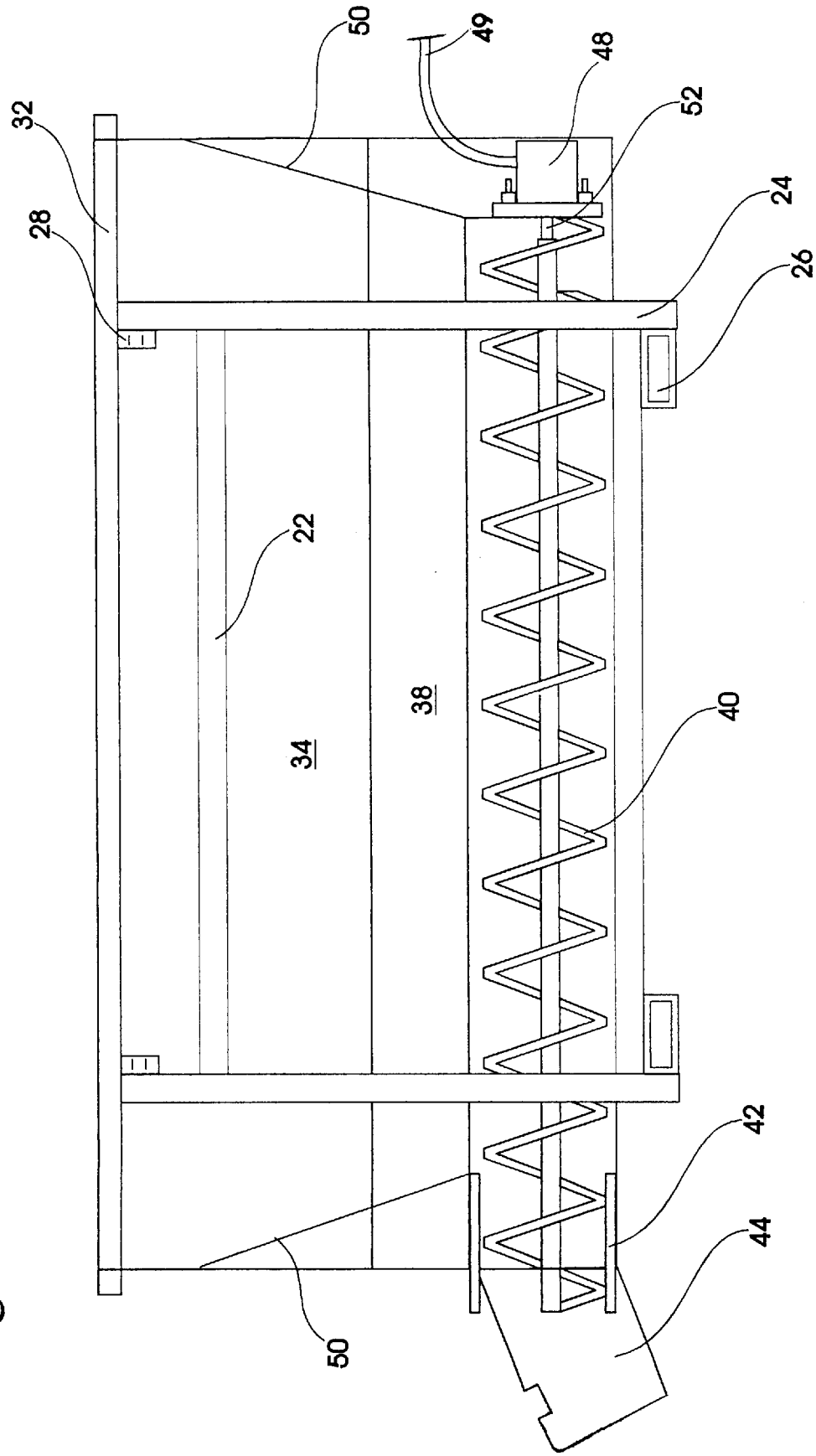
FIG. 2 is a cross sectional view of the trough hopper shown in FIG. 1 taken along line 2—2 therein.

FIG. 2 is a cross sectional view of the trough hopper 20 shown in FIG. 1 taken along line 2—2 therein. FIG. 2 additionally includes the flexible bladed auger 40 which is coupled to a hydraulic drive 48 on one end portion and is positioned within the discharge sleeve 42 on its other opposite end portion. The clearance between the auger 40 and the bottom portion of the feed trough 30 and between the augur 40 and the discharge sleeve 42 ranges between zero and a minimal amount. With a flexible bladed auger there is no need to provide clearance for granular particles of greater than average size. In this invention the flexible bladed auger 40 is defined to be any auger having a flexible blade portion. The flexible bladed auger is preferably like but not limited to, the flexible bladed auger described in the concurrently filed application referenced above.

FIG. 2 additionally shows the preferred embodiment wherein the endwalls 36 have an inwardly sloped portion 50. The shaft 52 of a drive, which most preferably is an hydraulic drive 48, extends through the feed trough 30 where it is coupled to the flexible bladed auger 40. The hydraulic drive 48 is driven by an hydraulic pump on a loader (not shown) through hydraulic lines 49. A lever valve (not shown) is generally positioned on the loader (not shown) in the hydraulic line 49 to control the speed of the auger 40. The lever valve (not shown) may be positioned on the hopper 20 to better regulate the discharge.

Figure 3:
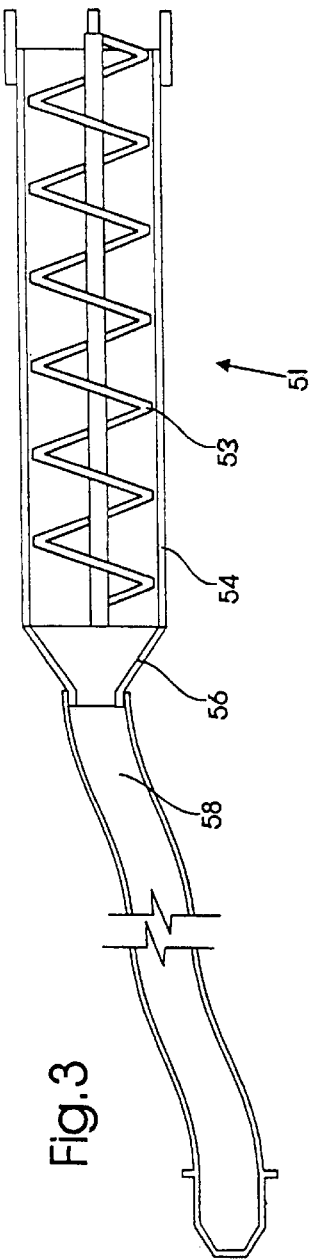
FIG. 3 is a cross sectional side view of a grout pumping adaptor for the trough hopper shown in FIG. 1.

FIG. 3 is a cross sectional side view of a grout pumping adaptor 51 for the loader hopper 20 shown in FIG. 1. The grout pumping auger adaptor 51 comprises a flexible bladed auger extension 53 having one end adapted for coupling to the flexible bladed auger 40; a sleeve extension 54 having one end adapted to be coupled to the discharge sleeve 40 and the other end fastened to a reducer 56; and, a flexible hose 58. Generally the sleeve extension 54 and the flexible bladed auger extension 53 are 2½' in length; however, this length may vary with the grout delivery pressure required. The flexible hose 58 may be more than 100' in length; however, it is expected that a 4" diameter hose 58 which is 20' in length would be satisfactory for most applications.

Figure 4:
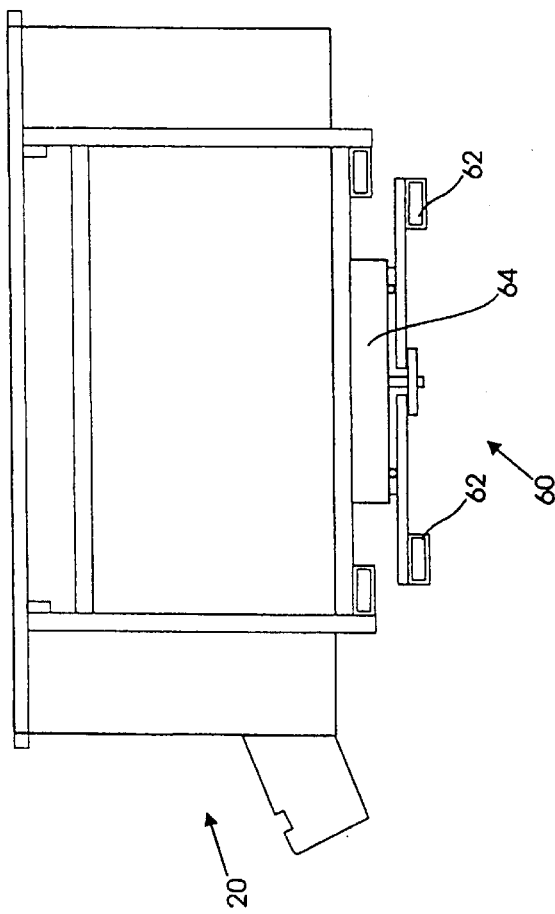
FIG. 4 is a side view of the trough hopper shown in FIG. 1 mounted on a forklift pivot assembly. The forklift pivot assembly allows one to better direct and accurately place concrete discharged from the loader hopper into an adjacent form.

FIG. 4 is a side view of the trough hopper 20 shown in FIG. 1 mounted on a forklift pivot assembly 60. The forklift pivot assembly 60 comprises a second pair of fork channels 62 which pivotally carry the hopper 20. The forklift pivot assembly 60 allows one to better direct and more accurately place concrete discharged from the trough hopper 20.

Figure 5:
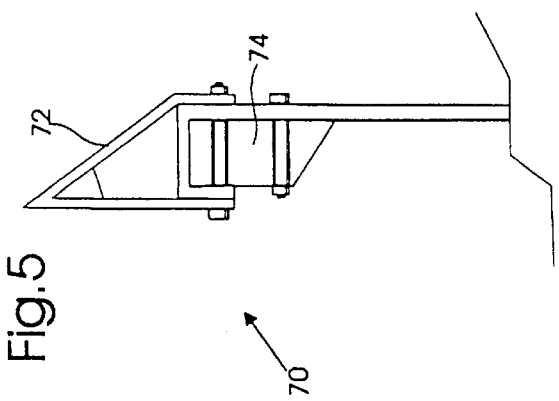
FIG. 5 is a cross sectional view of a blade member mounted on the top side portion of the trough hopper shown in FIG. 1.

FIG. 5 is a cross sectional view of a blade member 70 mounted on the top rail 32 on a top side portion of the hopper 20 shown in FIG. 1. The blade 70 is bolted over and fully around the rectangular top rail 32. The blade 70 comprises a triangular blade portion 72 and a rectangular reinforcing block 74 which provide additional support to the top rail 32 when the hopper 20 is being used as a scoop for sand or other granular material which must be discharged in a measured amount or otherwise accurately placed.

FIG. 6 is a partial side view of the discharge end of the trough hopper 20 shown in FIG. 1 having a rotatable discharge chute 80 mounted thereon. FIG. 7 is a top view of the rotatable discharge chute 80 shown in FIG. 6. The rotatable discharge chute 80 is carried by a vertical bar 82 which has one end attached to the discharge endwall 36 of the hopper 20 and the other attached to a bottom portion thereof. A sleeve having a lower end portion centrally connected to an upper end of the rotatable discharge chute 80 and an upper end portion from which opposite sides of the lower end of the rotatable discharge chute 80 are suspended is rotatably mounted on the vertical bar 82.

FIG. 8 is a partial side view of the discharge end of the hopper 20 shown in FIG. 1 having an hydraulically controlled discharge cover 92 mounted on and over the discharge end portion of the discharge sleeve 42. A rubber or plastic gasket 94 is mounted on the interior of the cover 92. The hydraulically controlled cover 92 facilitates the retention of contaminated soil or a slurry in the hopper 20 while being transported.

FIG. 9 is a perspective view of a hopper extension 96 which may be bolted onto the top rail 32 of the top side portion of the hopper 20 shown in FIG. 1. The hopper extension 96 effectively doubles the capacity of the hopper 20.

In the preferred embodiment the trough 30 is generally six foot long, two foot wide, and one and one half feet high. The size of the trough 30 may be adapted to the loader which is being used, and to the application which it is being used for.

The hopper 20 has been found to be particularly advantageous in tight spaces. The hopper 20 has utility in moving granular particles as well as granular particles in a slurry. When it replaces a mixed cement bucket used with a crane, it has been found that one man can do the work normally done by nine men. The grout pumping adaptor 51 similarly dramatically reduces labor involved in grouting applications.

While the invention has been described with preferred specific embodiments thereof, it will be understood that this description is intended to illustrate and not to limit the scope of the invention, which is defined by the following claims.

I claim:

1. A hopper for use with a loader comprising:
    an elongate feed trough having two opposite end portions and an open top side portion so that the trough may be filled along the open top side portion;

an elongate auger having flexible blades, to facilitate non-jamming operation, positioned in and extending along a bottom portion of the trough, said auger having a drive end portion and a floating discharge end portion;

drive means positioned adjacent to one end portion of the trough and releasably connected to the drive end portion of the auger;

a discharge sleeve positioned in the other end portion of the trough encircling the other floating discharge end portion of the auger;

wherein the clearance between the auger and the bottom portion of the trough, and between the augur and the discharge sleeve, ranges between zero and a minimal amount without any allowance for granular particles of greater than average size; and;

means to lift the trough from a long side portion thereof with the loader so that the center of gravity of the trough is closely adjacent to the loader, and enabling an operator thereof to view, meter, and accurately position the discharge end of the auger.

2. A hopper as in claim 1 further comprising a frame which supports the trough.

3. A hopper as in claim 2 wherein the means to lift the trough comprises fork channels secured to a bottom portion of the frame.

4. A hopper as in claim 3 further comprising a blade member mounted on and around a top side portion of the trough to facilitate scooping with the hopper.

5. A hopper as in claim 3 further comprising a pivoting joint under a central bottom portion of the hopper, centrally between and above a pair of fork channels, to allow the hopper to turn for better placement of its load.

6. A hopper as in claim 1 wherein the drive means comprises an hydraulic pump which is adapted to be removably connected to the loader.

7. A hopper as in claim 6 further comprising lifting hasps affixed to a top outside portion of the frame.

8. A hopper as in claim 6 wherein the discharge sleeve positioned in the other end portion of the trough is adapted to support a discharge chute removably connected thereto.

9. A hopper as in claim 8 further comprising a rotatable discharge chute.

10. A hopper as in claim 1 further comprising an hydraulically controlled discharge cover mounted on and over the discharge end portion of the discharge sleeve.

11. A hopper as in claim 1 further comprising a hopper extension which may be fastened onto a top side portion of the hopper to increase the capacity thereof.

* * * * *